United States Patent [19]

Snider

[11] Patent Number: 5,035,529

[45] Date of Patent: Jul. 30, 1991

[54] RIVET SHAVER ROTATIONAL LOCKING SYSTEM

[76] Inventor: Phil Snider, R.R. #1, Hicksville, Ohio 43526

[21] Appl. No.: 390,146

[22] Filed: Aug. 7, 1989

[51] Int. Cl.⁵ .............................. F16D 1/00
[52] U.S. Cl. ..................... 403/24; 403/362; 403/355
[58] Field of Search .............. 403/355, 362, 24

[56] References Cited

U.S. PATENT DOCUMENTS 2,283,514  5/1942  Stanworth ............... 403/362 X

FOREIGN PATENT DOCUMENTS 498052  1/1939  United Kingdom ............... 403/362

Primary Examiner—Andrew V. Kundrat

[57] ABSTRACT

A locking system for preventing rotation of the adjustment bushing with respect to the shaft housing in a rivet shaver includes a threaded hole formed in the shaft housing. Located over the threaded hole is a slot which is formed in the adjustment bushing. A threaded fastener passes through the slot and into the threaded hole formed in the shaft housing. The threaded fastener is retained in position by the frictional engagement of the threaded fastener with the shaft housing.

3 Claims, 1 Drawing Sheet

RIVET SHAVER ROTATIONAL LOCKING SYSTEM

The present invention relates to rivet shavers; more particularly, the present invention relates to locking systems which prevent the rotation of the adjustment bushing with respect to the housing in rivet shavers.

In order for a rivet shaver to operate properly it is necessary that the housing portion of the rivet shaver be rotationally locked to the adjustment portion of the rivet shaver. This has been accomplished in several ways in the past. Particularly, a dog point set screw has been threaded in through the adjustment portion and caused to enter a slot in the housing. Similarly, a key has been press fit into the housing and caused to ride in a slot in the adjustment bushing. Both of these two methods have proven to be unsatisfactory in that either the dog point set screw or the key will vibrate loose. After the dog point set screw or key vibrates loose it will jam within the rivet shaver and thus make it impossible to disassemble or adjust the rivet shaver.

There is therefore a need in the art to provide a locking system for use with a rivet shaver wherein the locking element will not vibrate loose upon operation of the tool.

SUMMARY OF THE INVENTION

A locking system for preventing rotation of the adjustment bushing with respect to the housing in a rivet shaver includes a threaded hole formed in the housing. Located over the threaded hole is a slot which is formed in the adjustment bushing. A threaded fastener passes through the slot and into the threaded hole formed in the housing. The threaded fastener is retained in position by the frictional engagement of the threaded fastener with the housing.

BRIEF DESCRIPTION OF THE FIGURES

A better understanding of the locking system of the present invention may be had by reference to the figures wherein.

BRIEF DESCRIPTION OF THE EMBODIMENTS

Figure 1:
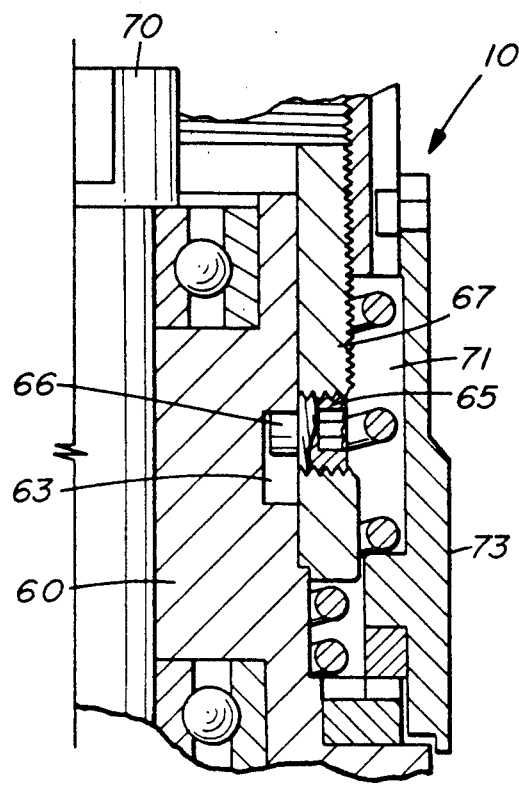
FIG. 1 is a prior art method of locking the adjustment bushing of a rivet shaver to the housing using a dog point set screw.

To understand the present invention it is necessary to understand the prior art. In rivet shavers 100 it is important that the adjustment bushing 67 which positions the cutter not rotate with respect to the shaft housing 60. In prior art rivet shavers this was typically accomplished in one of two ways. The first method is shown in FIG. 1. Therein a dog point set screw 65 passes through bushing 67 into shaft housing 60. The end 66 of set screw 65 enters a slot 63 in shaft housing 60 which thus prevents rotation of the adjustment bushing 67 with respect to the housing 60. Because of the vibrations normally associated with air tool use set screw 65 may back out and become lodged in the cavity 71 between collar 73 and bushing 67. Once this happens it becomes impossible to adjust or disassemble the rivet shaver.

Figure 2:
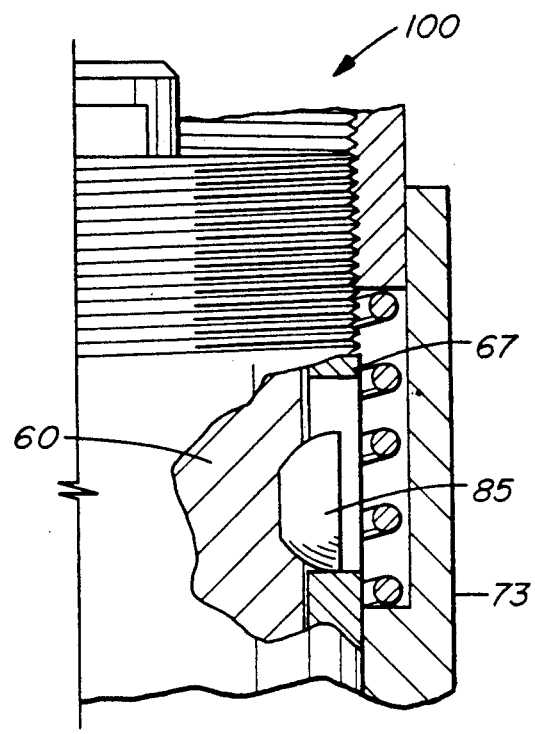
FIG. 2 is a prior art method of locking the adjustment bushing of a rivet shaver to the rivet shaver housing using a key.

In FIG. 2 a second prior art method of locking the adjustment bushing 67 to shaft housing 60 in a rivet shaver using a Woodruff key 85 is shown, key 85 is press fit into shaft housing 60. If key 85 becomes loose it may become tilted and prevent longitudinal movement of the bushing 67 with respect to the housing 60. Such prevention of movement will render the rivet shaver inoperative.

Figure 3:
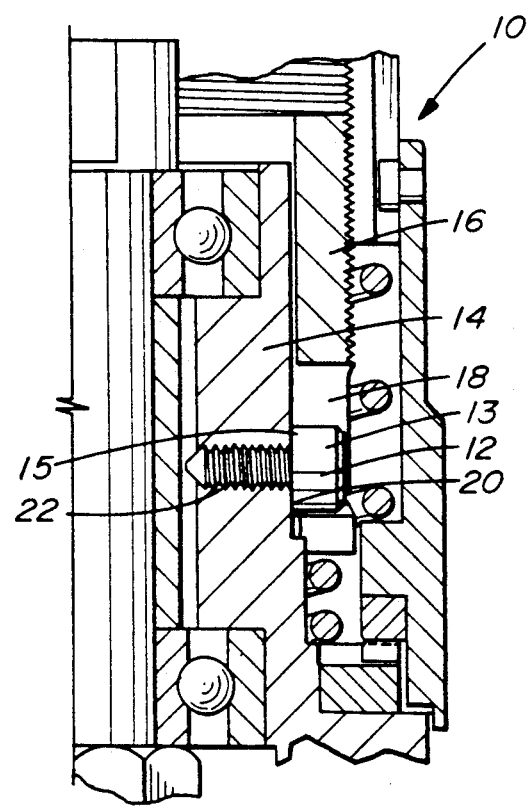
FIG. 3 is side elevational view in partial section of the locking system of the present invention.

As shown in FIG. 3 the locking system of the present invention 10 includes a cap screw 12 which is threaded into housing 14. Cap screw 12 is placed in tension. This accomplishes three things. First, adjustment bushing 16 is rotationally locked in position with respect to shaft housing 14 as the cap portion 13 of cap screw 12 fits within slot 18 formed in bushing 16. Secondly, the tension placed on cap screw 12 creates a frictional force between the underside 15 of the cap screw head 13 and the side 20 of housing 14. This frictional force tends to keep the cap screw 12 in place. Thirdly, the complete insertion of cap screw 12 into housing 14 results in an interference threaded fit of cap screw 12 into the threaded hole 22 in shaft housing 14. This interference fit occurs because in the space just under the head of typical cap screws there is an imperfectly formed thread or a flat portion. When this imperfectly formed thread or flat portion is threaded into threaded hole 22 in shaft housing 14 an interference fit occurs with the uppermost thread in threaded hole 22. It is this interference fit which assists in retaining screw 12 in position.

According to the present invention there is provided a locking system for a rivet shaver wherein the locking element is not free to vibrate lose and thus jam the components within the rivet shaver.

Still other embodiments of the locking system of the present invention will be apparent to those of ordinary skill in the art once having read the foregoing description and accompanying claims.

I claim:

1. A locking system for preventing rotation of the adjustment bushing with respect to the shaft housing in a rivet shaver, said locking system comprising:
   a threaded hole formed in said shaft housing;
   means for allowing axial movement formed in the adjustment bushing;
   a threaded fastener having a head member and a threaded shaft portion, said threaded fastener constructed and arranged so that said head member passes through said means for allowing axial movement in the adjustment bushing and said threaded shaft threadably engages the shaft housing and is retained in place by the frictional engagement of the headed portion of said threaded fastener with the shaft housing.

2. The locking system is defined in claim 1 wherein said means for allowing axial movement in the adjustment bushing is a slot.

3. The locking system is defined in claim wherein said frictional engagement further includes an interference fit between the threaded shaft portion of said threaded fastener and the threaded hole formed in said housing.

* * * * *